United States Patent
Choi

(10) Patent No.: US 10,378,597 B2
(45) Date of Patent: Aug. 13, 2019

(54) BRAKE CALIPER ASSEMBLY

(71) Applicants: Hyundai Motor Company, Seoul (KR); Kia Motors Corporation, Seoul (KR)

(72) Inventor: Moon Hyeok Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/829,574

(22) Filed: Dec. 1, 2017

(65) Prior Publication Data

US 2018/0231076 A1    Aug. 16, 2018

(30) Foreign Application Priority Data

Feb. 15, 2017 (KR) .................. 10-2017-0020262

(51) Int. Cl.
| | | |
|---|---|---|
| F16D 65/14 | (2006.01) | |
| F16D 65/00 | (2006.01) | |
| F16D 55/226 | (2006.01) | |

(52) U.S. Cl.
CPC ..... *F16D 65/0006* (2013.01); *F16D 65/0068* (2013.01); *F16D 55/226* (2013.01); *F16D 65/0081* (2013.01)

(58) Field of Classification Search
CPC ........ F16D 55/22; F16D 55/226; F16D 65/14; F16D 65/0081; F16D 2055/0037; F16D 2055/0041

USPC ............. 188/72.4, 72.5, 73.31, 73.43, 218 A
See application file for complete search history.

(56) References Cited

U.S. PATENT DOCUMENTS

| | | | |
|---|---|---|---|
| 8,671,604 B2 * | 3/2014 | Mallmann | F16D 55/02 188/73.31 |
| 9,267,557 B2 | 2/2016 | Boyle | |
| 2004/0074716 A1 * | 4/2004 | Brumfield | F16D 55/22 188/218 A |
| 2009/0152056 A1 * | 6/2009 | Heinz | F16D 65/097 188/72.5 |
| 2009/0321198 A1 * | 12/2009 | Barland | F16D 65/0031 188/264 A |
| 2010/0163350 A1 * | 7/2010 | Bach | F16D 55/226 188/73.43 |
| 2015/0260244 A1 * | 9/2015 | Maehara | F16D 65/0087 188/72.4 |
| 2016/0025162 A1 * | 1/2016 | Morse | F16D 65/0081 188/218 A |

FOREIGN PATENT DOCUMENTS

| | | | | |
|---|---|---|---|---|
| DE | 4101514 | * | 7/1992 | .......... F16D 55/226 |
| JP | 2009-243682 A | | 10/2009 | |
| JP | 2013-108548 A | | 6/2013 | |

* cited by examiner

*Primary Examiner* — Christopher P Schwartz
(74) *Attorney, Agent, or Firm* — Morgan, Lewis & Bockius LLP

(57) ABSTRACT

A brake caliper assembly may include a caliper body; and a styling cover which is assembled to a seat portion of the caliper body, wherein the styling cover has a mounting rib which is fastened in a state of being inserted into and in contact with an opening portion formed in the seat portion.

5 Claims, 4 Drawing Sheets

BRAKE CALIPER ASSEMBLY

CROSS-REFERENCE(S) TO RELATED APPLICATIONS

The present application claims priority to Korean Patent Application No. 10-2017-0020262, filed on Feb. 15, 2017, the entire contents of which is incorporated herein for all purposes by this reference.

BACKGROUND OF THE INVENTION

Field of the Invention

The present invention relates to a brake caliper assembly. More particularly, the present invention relates to a brake caliper assembly which ensures a fastening force of a styling cover disposed to a caliper body and prevents vibration.

Description of Related Art

A disc brake for a vehicle generates a braking force by bringing a brake pad into close contact with a brake disc which has a circular plate shape and rotates together with a wheel hub. When a brake pedal is depressed, hydraulic pressure, which is required for braking, is forcedly transmitted to a brake caliper from a master cylinder, and the brake caliper brings the brake pad into close contact with the brake disc by the hydraulic pressure.

Meanwhile, the brake calipers (hereinafter, referred to as 'calipers') are broadly classified into floating calipers and fixed calipers. In the case of the fixed caliper, two pistons, which are disposed in a caliper body, bring brake pads (hereinafter, referred to as 'pads') into close contact with the disc at both sides of a brake disc (hereinafter, referred to as a 'disc'). In the case of the floating caliper, a single piston, which is disposed in the caliper body, brings one pad into close contact with the disc, and the caliper body is moved by the resulting reaction force, bringing the other pad, or the opposite pad, into close contact with the disc.

The floating caliper is relatively limited in terms of freedom of design in comparison with the fixed caliper, which causes deterioration in an external aesthetic appearance.

Thus, a styling cover is used to improve the external aesthetic appearance of the floating caliper, but there is a problem in that the styling cover vibrates in a case in which a gap is formed between the caliper body and the styling cover disposed to the caliper body.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a brake caliper assembly configured for preventing a gap from being formed between a caliper body and a styling cover by a structure that may ensure a fastening force between the caliper body and the styling cover, and configured for preventing a vibration of the styling cover caused by the gap by a structure that may resiliently support the caliper body and the styling cover.

Various aspects of the present invention are directed to providing a brake caliper assembly including: a caliper body; and a styling cover which is disposed to a seat portion of the caliper body, in which the styling cover has a mounting rib which is fastened in a state of being inserted into and in close contact with an opening portion formed in the seat portion.

In an exemplary embodiment of the present invention, a screw member, which is fastened to the opening portion of the caliper body while penetrating the mounting rib, may be disposed to the mounting rib, and a vibration-proof member, which elastically supports the styling cover, may be interpose the seat portion of the caliper body and the styling cover.

In another exemplary embodiment of the present invention, the vibration-proof member may include a base plate which is inserted in a surface-to-surface contact state between the seat portion of the caliper body and the styling cover, and a plurality of flat spring portions which is formed on the base plate to be bent and resiliently restorable, and the plurality of flat spring portions may be divided and disposed on the base plate based on the mounting rib of the styling cover.

In yet another exemplary embodiment of the present invention, the base plate may have a mounting arm which is fixed to the mounting rib by the screw member which is fastened to the opening portion of the caliper body while penetrating the mounting rib. The mounting arm may have a through hole which is penetrated by the screw member, and the mounting arm may be bent from the base plate.

In yet another exemplary embodiment of the present invention, the styling cover may have seating grooves which provide regions in which the flat spring portions, which are bent and protrude from the base plate, are positioned.

The brake caliper assembly according to an exemplary embodiment of the present invention has the following advantages.

The mounting rib of the styling cover, which is inserted into and in close contact with the opening portion of the caliper body, is fastened to the opening portion by the screw member, and as a result, it is possible to ensure the fastening force between the caliper body and the styling cover and to prevent a gap from being formed between the caliper body and the styling cover by ensuring the fastening force.

The vibration-proof member for elastically supporting the caliper body and the styling cover is provided, wherein the caliper body and the styling cover are elastically supported when a gap is formed between the caliper body and the styling cover, and as a result, it is possible to minimize vibration of the styling cover.

Only two components including the vibration-proof member and the screw member are used to dispose the styling cover to the caliper body, and as a result, it is possible to improve a manufacturing process efficiency and reduce material costs.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
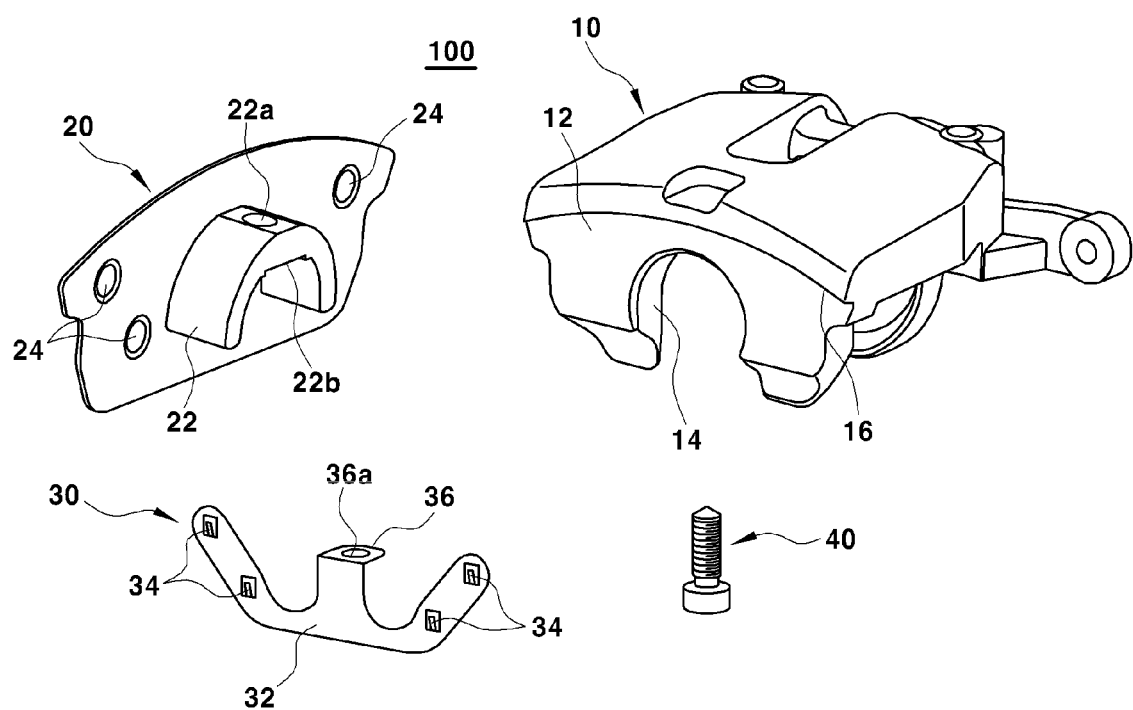
FIG. 1 and FIG. 2 are exploded perspective views illustrating a brake caliper assembly according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
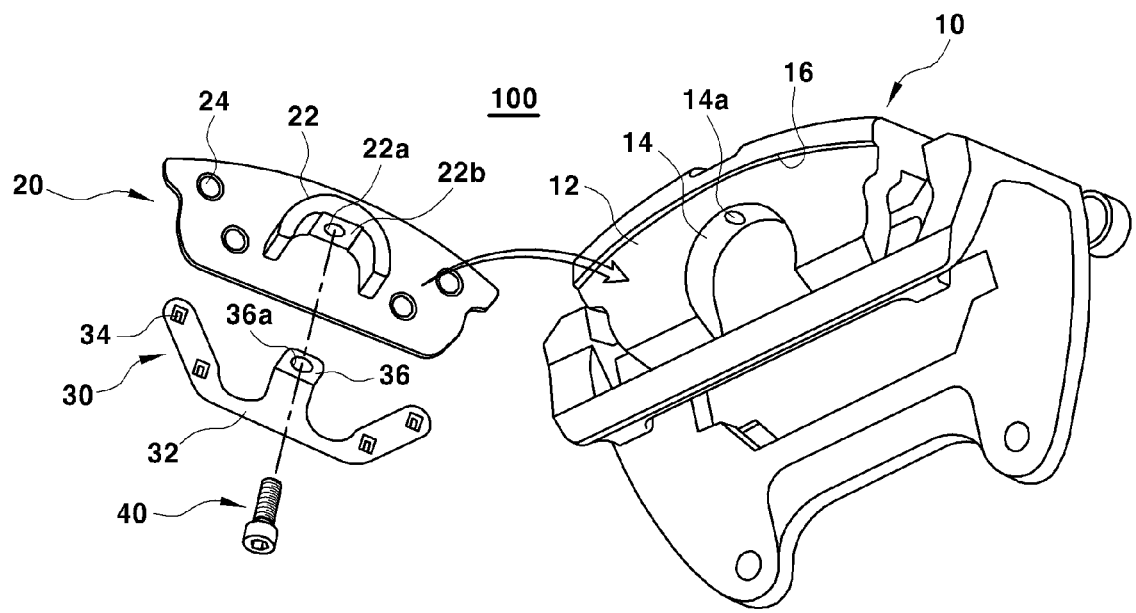
Figure 3:
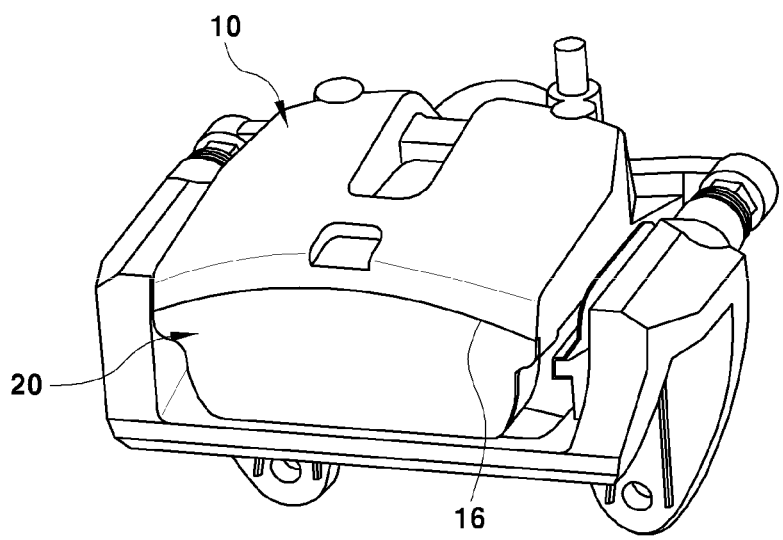
FIG. 3 is a coupled perspective view illustrating the brake caliper assembly according to an exemplary embodiment of the present invention.

As illustrated in FIG. 1, FIG. 2, and FIG. 3, a brake caliper assembly 100 according to an exemplary embodiment of the present invention includes a caliper body 10, a styling cover 20 which is disposed in a surface-to-surface contact state onto a seat portion 12 formed at one side of the caliper body 10, and a vibration-proof member 30 which elastically supports the styling cover 20.

The caliper body 10 is a caliper body for a disc brake. Typically, the caliper body 10 has a piston disposed to bring a brake pad into close contact with a disc when hydraulic pressure is applied, and has a structure that may surround the pad, which is to be in close contact with the disc, and is disposed at one side of the disc that rotates together with a wheel hub. The caliper body 10 has an approximate ⊏-shaped cross section.

The caliper body 10 has an opening portion 14 which is formed at a center of the seat portion 12 and opened at a lower side thereof to reduce a weight. The styling cover 20 covers the seat portion 12, in which the opening portion 14 is formed, when the styling cover 20 is mounted on the seat portion 12 of the caliper body 10. The styling cover 20 has a mounting rib 22 which is in close contact with and inserted into the opening portion when the styling cover 20 is assembled onto the seat portion 12 of the caliper body 10.

The mounting rib 22 perpendicularly protrudes from one surface of the styling cover 20 (an internal surface which is to be in surface-to-surface contact with the seat portion 12 of the caliper body), and the mounting rib 22 is fastened to the opening portion 14 of the caliper body 10 by a single screw member 40.

In more detail, the mounting rib 22 is structured to be able to be in close contact with the opening portion 14 of the caliper body 10, and the mounting rib 22 is fixed by the screw member 40 in a state in which the mounting rib 22 is in surface-to-surface contact with the opening portion 14 when the mounting rib 22 is inserted into the opening portion 14.

Figure 4:
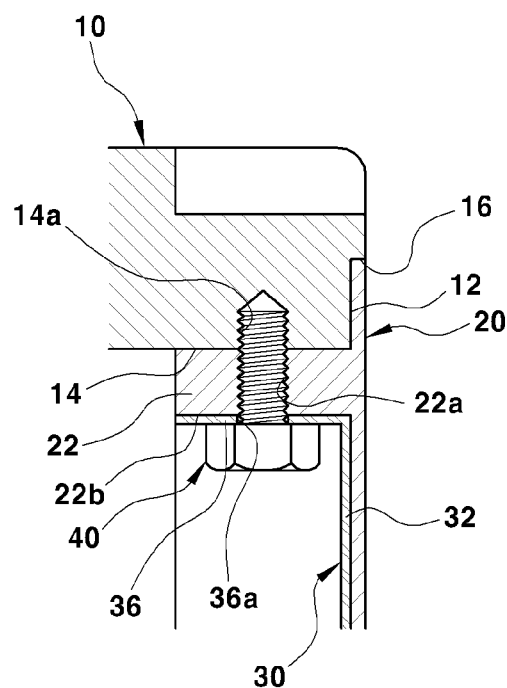
FIG. 4 is a partial cross-sectional view illustrating an assembling structure for the brake caliper assembly according to an exemplary embodiment of the present invention.

Referring to FIG. 1 and FIG. 2, the opening portion 14 is formed as an inverted 'U'-shaped groove opened at a lower side thereof, the mounting rib 22 is formed as a rounded and bent plate having an inverted 'U'-shaped cross section to be in close contact with the opening portion 14, and the screw member 40 is fastened to a center portion of the opening portion 14 while penetrating a center portion of the mounting rib 22 (see FIG. 4).

In the present case, assembly holes 22a and 14a, which are penetrated by the screw member 40, are formed in the center portion of the mounting rib 22 and the center portion of the opening portion 14. Internal thread structures, which correspond to an external thread structure formed on an external circumferential surface of the screw member 40, are formed in the assembly hole 22a of the mounting rib 22 and the assembly hole 14a of the opening portion 14 which are penetrated by the screw member 40. As a result, it is possible to ensure the fastening force between the caliper body 10 and the styling cover 20, and to inhibit and prevent a gap from being formed between the caliper body 10 and the styling cover 20.

As the screw member 40, a screw having a self-locking structure for release prevention may be used to ensure the fastening force.

A catching protrusion 16, which is to be in contact with and adjacent to an upper edge portion of the styling cover 20 when the styling cover 20 is disposed, is formed at an upper edge portion of the seat portion 12 of the caliper body 10, and the catching protrusion 16 supports the upper edge portion of the styling cover 20 when the styling cover 20 is disposed to the caliper body 10 since the catching protrusion 16 is disposed at an upper side of the opening portion 14 opened at the lower side thereof.

Therefore, the mounting rib 22 is fastened to the opening portion 14 of the caliper body 10 by the screw member 40 while being supported without swaying since the mounting rib 22 is inserted into the opening portion 14 while being in close contact with the opening portion 14. In the present case, the upper edge portion of the styling cover 20 is adjacent to the catching protrusion 16 and supported in the surface-to-surface contact state.

Meanwhile, as illustrated in FIG. 4 and FIG. 6, the vibration-proof member 30 is disposed between the seat portion 12 of the caliper body 10 and the styling cover 20.

As illustrated in FIG. 1, FIG. 2, and FIG. 5, the vibration-proof member 30 includes a base plate 32 which is inserted between and in surface-to-surface contact with the seat portion 12 of the caliper body 10 and the styling cover 20, a plurality of flat spring portions 34 which are curved or bent from the base plate 32 to be resiliently restorable, and a mounting arm 36 which is fastened to the mounting rib 22.

Figures 5A, 5B:
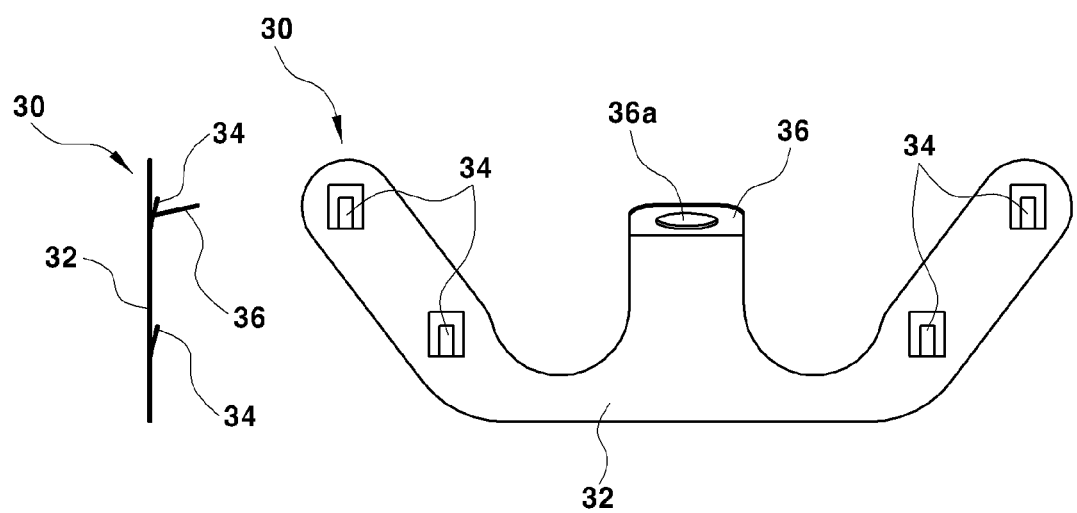
FIG. 5A and FIG. 5B are views illustrating a vibration-proof member according to an exemplary embodiment of the present invention.

The base plate 32 is formed in a form of a plate configured for being in surface-to-surface contact with the seat portion 12 and the styling cover 20. In the present case, to reduce a weight, the base plate 32 may be formed in a shape having only portions required to form the flat spring portions 34 and the mounting arm 36, and for example, the base plate 32 may be formed in an approximately E-shape, as illustrated in FIG. 5B.

In the present case, the mounting arm 36, which is fastened to the mounting rib 22, is integrally formed at one side of the base plate 32. The mounting arm 36, which is fastened to an internal surface of the mounting rib 22, is formed at a center of the base plate 32 having an E-shape.

The mounting arm 36 is bent at a right angle at one side of the base plate 32, and has a through hole 36a which is formed at a center portion of the mounting arm 36 and may be penetrated by the screw member 40.

The mounting arm 36 is fixedly supported by and in close contact with the internal surface of the mounting rib 22 by the screw member 40 that fastens the mounting arm 36 to the mounting rib 22. In the present case, a groove 22b into which the mounting arm 36 may be inserted is fabricated in an internal center portion of the mounting rib 22 (i.e., a portion of the internal surface of the mounting rib 22 which is peripheral to the assembly hole 22a), wherein the plate-shaped mounting arm 36 may be stably in close contact with the internal surface of the mounting rib 22 (see FIG. 2). The groove 22b may be formed to minimize a movement of the mounting arm 36 inserted into the groove 22b, that is, the groove 22b may be structured wherein the mounting arm 36 is in close contact with the internal of the groove 22b.

The plurality of flat spring portions 34 is formed to be divided into two pieces at both left and right sides of the base plate 32 wherein the flat spring portions 34 may be divided and disposed based on the mounting rib 22 of the styling cover 20 when the vibration-proof member 30 is disposed between the styling cover 20 and the caliper body 10.

Each of the flat spring portions 34 is formed integrally with the base plate 32 and bent and folded toward one side after the base plate 32 is partially formed. Therefore, the flat spring portion 34 protrudes from a surface of the base plate 32 toward one side and has a shape inclined at a predetermined angle with respect to the surface of the base plate 32 in a state in which only one edge portion of the flat spring portion 34 is integrally connected to the base plate 32.

The flat spring portions 34 generate an elastic restoring force by compressively deforming when the flat spring portions 34 are pressed and unfolded toward the surface of the base plate 32.

Since the vibration-proof member 30 including the flat spring portions 34 elastically support the caliper body 10 and the styling cover 20, it is possible to inhibit and minimize vibration of the styling cover 20 even though a gap is formed between the seat portion 12 of the caliper body 10 and the styling cover 20.

Seating grooves 24, which provide regions in which the flat spring portions 34 protruding from the surface of the base plate 32 may be positioned, are formed in one surface of the styling cover 20 (the internal surface from which the mounting rib 22 protrudes), and as a result, it is possible to prevent the flat spring portions 34 from being excessively compressed when the styling cover 20 is disposed to the caliper body 10, and thus prevent a gap from being formed between the caliper body 10 and the styling cover 20 due to an excessive elastic restoring force that occurs when the flat spring portions 34 are excessively compressed.

The brake caliper assembly 100 of the present invention, which is configured as described above, may prevent a gap from being formed between the caliper body 10 and the styling cover 20 by the provided configuration that ensures the fastening force between the caliper body 10 and the styling cover 20, and may inhibit and minimize vibration of the styling cover 20 by the configuration that elastically supports the styling cover 20 with respect to the seat portion 12 of the caliper body 10 when the gap is formed.

The vibration-proof member 30 may inhibit vibration in a thickness direction of the styling cover 20, a protruding direction of the mounting rib 22, or a left and right direction of a vehicle body when a gap is formed between the caliper body 10 and the styling cover 20. Also, the vibration-proof member 30 may prevent vibration in a longitudinal direction of the styling cover 20 since the mounting rib 22 is inserted into and in close contact with the opening portion 14 of the caliper body 10 when the styling cover 20 is fastened to the caliper body 10. Furthermore, the mounting rib 22 is fastened to the caliper body 10 by the screw member 40 which penetrates the mounting rib 22 in a width direction or an up and down direction of the styling cover 20 from a lower side of the opening portion 14, and the upper edge portion of the styling cover 20 is supported by and in contact with the catching protrusion 16 protruding from the upper edge portion of the seat portion 12 of the caliper body 10, and as a result, it is also possible to reduce vibration in the width direction of the styling cover 20.

An emblem including a symbol, a mark, or a letter may be marked on an external surface of the styling cover 20, improving an external aesthetic appearance.

Here, the functions of the seating groove 24 and the vibration-proof member 30 will be further described with reference to FIG. 6.

Figures 6A, 6B:
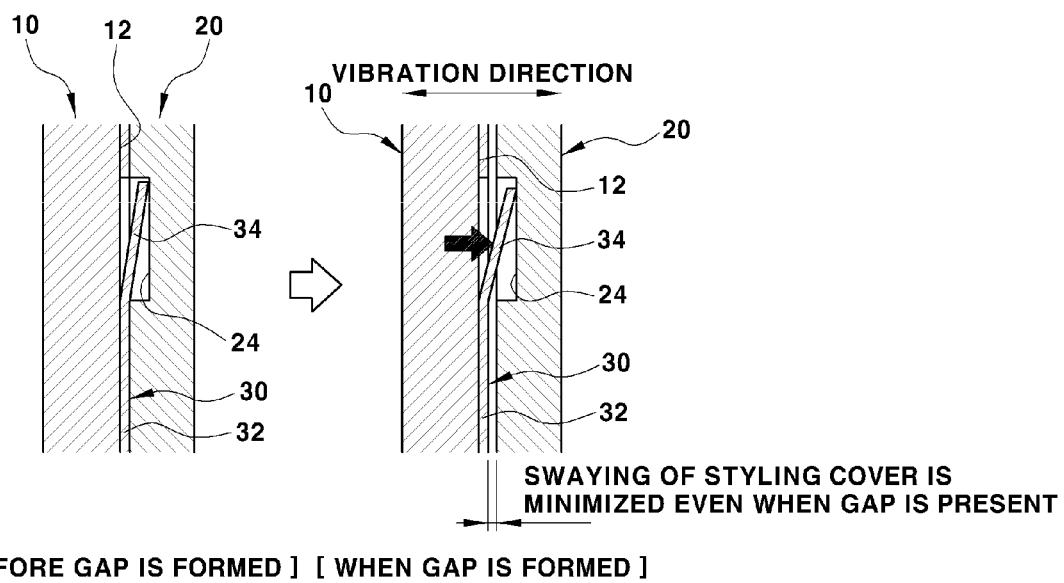
FIG. 6A and FIG. 6B are views for explaining functions of a seating groove of a styling cover and the vibration-proof member according to an exemplary embodiment of the present invention.

FIG. 6A illustrates a state in which the styling cover 20 is in close contact with the seat portion 12 of the caliper body 10, and FIG. 6B illustrates a state in which a gap is formed between the styling cover 20 and the seat portion 12 of the caliper body 10.

As illustrated in FIG. 6A, in a case in which no gap is formed between the seat portion 12 of the caliper body 10 and the styling cover 20, the flat spring portions 34 are compressed in a state of being pressed and unfolded by the styling cover 20 and positioned in the seating grooves 24.

In the present case, since the seating groove 24 is formed at a predetermined depth in the surface of the styling cover 20, the flat spring portion 34 is positioned in the region which is provided by the seating groove 24 and has a predetermined depth. As a result, the flat spring portion 34 is not completely (100%) unfolded to the base plate 32 to be horizontal with respect to the surface of the base plate 32, but the flat spring portion 34 is compressed to be unfolded only to a predetermined angle with respect to the surface of the base plate 32, and as a result, it is possible to prevent a gap from being formed between the caliper body 10 and the styling cover 20 due to the elastic restoring force that occurs when the flat spring portion 34 is compressed.

As illustrated in FIG. 6B, in a case in which a gap is formed between the seat portion 12 of the caliper body 10 and the styling cover 20, the elastic restoring force of the flat spring portions 34 elastically supports the styling cover 20 with respect to the seat portion 12 of the caliper body 10.

In the present case, the elastic restoring force of the flat spring portions 34 are slightly decreased because the flat spring portions 34 are further unfolded as the gap is formed between the seat portion 12 of the caliper body 10 and the styling cover 20 in comparison with the state before the gap is formed. However, because the flat spring portions 34 still remain compressed between the seat portion 12 and the styling cover 20, the flat spring portions 34 generate the elastic restoring force by being compressed, and the elastic restoring force elastically supports the styling cover 20 with respect to the seat portion 12 of the caliper body 10, preventing vibration of the styling cover 20.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to therebe enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake caliper assembly comprising:
   a caliper body; and
   a styling cover which is assembled to a seat portion of the caliper body,
   wherein the styling cover has a mounting rib which is fastened in a state of being inserted into and in contact with an opening portion formed in a center of the seat portion,
   wherein a screw member, which is fastened to the opening portion of the caliper body while penetrating the mounting rib, is disposed to the mounting rib, and
   wherein a vibration-proof member, which elastically supports the styling cover, is disposed between the seat portion of the caliper body and the styling cover.

2. The brake caliper assembly of claim 1, wherein the vibration-proof member includes a base plate which is inserted in a surface-to-surface contact state between the seat portion of the caliper body and the styling cover, and a plurality of flat spring portions which is formed on the base plate to be bent to be resiliently restorable.

3. The brake caliper assembly of claim 2, wherein the plurality of flat spring portions is divided and disposed on the base plate based on the mounting rib of the styling cover.

4. The brake caliper assembly of claim 2, wherein the base plate has a mounting arm which is fixed to the mounting rib by a screw member which is fastened to the opening portion of the caliper body while penetrating the mounting rib.

5. The brake caliper assembly of claim 2, wherein the styling cover has seating grooves which provide regions in which the flat spring portions, which are bent and protrude from the base plate, are positioned.

* * * * *